United States Patent
Hein et al.

(10) Patent No.: US 9,310,597 B2
(45) Date of Patent: Apr. 12, 2016

(54) METHOD FOR CORRECTING PARCENTRICITY IN ZOOM SYSTEMS

(71) Applicant: Carl Zeiss Microscopy GmbH, Jena (DE)

(72) Inventors: Detlef Hein, Goettingen (DE); Steffen Leidenbach, Reinhausen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 18 days.

(21) Appl. No.: 14/108,842

(22) Filed: Dec. 17, 2013

(65) Prior Publication Data
US 2014/0168762 A1    Jun. 19, 2014

(30) Foreign Application Priority Data

Dec. 18, 2012  (DE) .......................... 10 2012 024 737

(51) Int. Cl.
*G02B 21/22* (2006.01)

(52) U.S. Cl.
CPC ...................................... *G02B 21/22* (2013.01)

(58) Field of Classification Search
CPC ...... G02B 21/00; G02B 21/025; G02B 21/18; G02B 21/20; G02B 21/22; G02B 21/26; G02B 21/32; G02B 21/36; G02B 21/365; G02B 21/367; G06T 7/0018; G06T 7/002; G06T 7/0024; G06T 7/0026; G06T 7/0028; G06T 7/004; G06T 7/0042; G06T 3/0006; G06T 3/40; G06T 3/4007; H04N 1/3872–1/387; G06K 9/32; G06K 9/3208; G06K 9/3216; G06K 9/3233; G06K 9/3241; G06K 9/6203; G06K 2009/3225
USPC ......... 359/368–390, 391, 393, 470, 676–677, 359/683, 685, 697; 250/200, 201.1, 250/206–206.1; 382/107, 293–296, 298
See application file for complete search history.

(56) References Cited

U.S. PATENT DOCUMENTS

| | | | |
|---|---|---|---|
| 6,930,828 B2 | 8/2005 | Faber | |
| 7,116,474 B2 | 10/2006 | Faber | |
| 8,300,308 B2 * | 10/2012 | Tamura | 359/381 |
| 2002/0176160 A1 * | 11/2002 | Suzuki et al. | 359/380 |
| 2005/0163398 A1 * | 7/2005 | Ioka | 382/284 |

FOREIGN PATENT DOCUMENTS

WO   WO2004/040352   5/2004

OTHER PUBLICATIONS

MBF Bioscience Inc., Parcentric & Parfocal Calibration, https://youtu.be/GEuMte-gKGs, published Dec. 5, 2012, Accessed May 7, 2015.*
Greivenkamp, John E., Field Guide to Geometrical Optics, SPIE Press, 2004, p. 46.*
Archer, Branden and Weisstein, Eric W, "Lagrange Interpolating Polynomial," From MathWorld—A Wolfram Web Resource, http://mathworld.wolfram.com/LagrangeInterpolatingPolynomial.html, Published at least as of Aug. 20, 2011 (Internet Archive, https:\\archive.org), Accessed Apr. 23, 2015.*

\* cited by examiner

*Primary Examiner* — Stephone B Allen
*Assistant Examiner* — Adam W Booher
(74) *Attorney, Agent, or Firm* — Patterson Thuente Pedersen, P.A.

(57) ABSTRACT

A method for correcting the parcentricity in zoom systems. The positional difference in the image between at least two different zoom positions is detected in order to explicitly or implicitly determine the position in the image which remains stationary during zooming. The travel lengths of a means for positioning the object in the object plane required for correcting the zoom-dependent parcentricity error are calculated and provided as control variable for the appropriate positioning of the means for positioning the object in the object plane, such that the target position appears stationary in the image after or during zooming.

13 Claims, 7 Drawing Sheets

METHOD FOR CORRECTING PARCENTRICITY IN ZOOM SYSTEMS

RELATED APPLICATIONS

The present application claims priority to German Application No. 102012024737.0 filed Dec. 18, 2012, said application being incorporated herein in its entirety by reference.

FIELD OF THE INVENTION

The invention relates to a method for correcting parcentricity in zoom systems, particularly for stereomicroscopes and macroscopes.

BACKGROUND OF THE INVENTION

WO 2004/040352 A2 describes an additional element for a stereomicroscope which allows for parcentric imaging of a stereo and a compound objective on a zoom system. The described parcentricity, however, is only given due to the constructive arrangement, i.e., it was constructively ensured that the parcentricity is given on the basis of the provided nominal dimensions and/or without taking actually occurring production deviations into account. No simple means for correcting the parcentricity deviations were disclosed that allow for compensation of all effective production deviations of the components involved without great effort, i.e., the adherence to narrow production tolerances is absolutely necessary.

U.S. Pat. No. 7,116,474 B2 and U.S. Pat. No. 6,930,828 B2 describe special microscope systems for in-vitro fertilization which enable parcentric imaging of different stereo and compound objectives on a zoom system. A more elaborate mechanism was described for constructively ensuring parcentricity, i.e., it was merely constructively ensured that the parcentricity is based on the provided nominal dimensions and/or without taking actually occurring production deviations into account. No simple means for correcting the parcentricity deviations were disclosed, however, that enable compensation of all effective production deviations of the components involved without great effort, i.e., the adherence to narrow production tolerances is once again absolutely necessary.

SUMMARY OF THE INVENTION

Embodiments of the claimed invention address a method for correcting the parcentricity for zoom systems, primarily for stereomicroscopes and macroscopes such that the parcentricity deviations from a desired target position, caused by production tolerances, are completely corrected during zooming in a relatively simple manner.

According to embodiments of the invention, the positional difference in the image between at least two different zoom positions is detected in order to explicitly or implicitly determine the position in the image that remains stationary during zooming (zoom center). The travel lengths of a means for positioning the object in the object plane required for correcting the zoom-dependent parcentricity error are calculated and provided as a control variable for the appropriate positioning of the means for positioning the object in the object plane, so that the target position appears stationary in the image after or even during zooming.

For detecting the positional differences, an input method (sequence) is processed, wherein the user performs the necessary inputs using a control and display unit, and the input method includes the following steps:

a) selecting an input method using a button;
b) selecting a reference configuration i (index for components) displayed in the control and display unit in a predetermined catch position;
c) selecting a first larger zoom magnification using a button;
d) positioning an object detail visible in the image in the entire zoom region, using a means for positioning the object, in the object plane in the target position in the image;
e) storing said target position for the first zoom magnification;
f) selecting a second, smaller zoom magnification using a button;
g) positioning the object detail in the target position in the image using the means for positioning the object in the object plane;
h) storing said actually attained target position for the second zoom magnification;
i) advancing the objective to a next available catch position, if applicable, and repeating steps a) to h);
j) optionally selecting each of a plurality of further objectives, and selecting the first of a plurality of available catch positions for each objective, and repeating steps a) through i) for each additionally selected objective;
k) exiting the input method using a button, whereupon the required travel length for parcentricity correction is calculated, using the stored values, according to the mathematical relationship:

$$Di(m)=(((1/m)-(1/mo))/((1/mu)-(1/mo)))*Diu+((1/mu)-(1/m))/((1/mu)-(1/mo)))*Dio;$$

where:
Di(m) is an XY-vector of a travel length in the object plane required for parcentricity correction for a configuration with the index i at a current magnification m;
Diu is an XY-vector of the travel length in the object plane required for parcentricity correction for a configuration with the index i at a second magnification mu;
Dio is an XY-vector of the travel length in the object plane required for parcentricity correction for a configuration with the index i at a first magnification mo;
m is the current magnification between the object plane and the image plane;
mo is the first magnification between the object plane and the image plane with greater zoom factor; and
mu is the second magnification between the object plane and the image plane with smaller zoom factor.

This method, according to embodiments of the invention, is based on the knowledge that in every zoom system, there is a zoom center, characterized by the position in the image which remains stationary during zooming (i.e., a pixel in the zoom center that does not change its position during zooming). The components influencing parcentricity, and therefore the accuracy of the zoom center are: the objectives; nosepiece; carrier of the nosepiece; zoom body; intermediate tubes; tubes; and/or camera adapter. Typically the production tolerances of these relevant components lead to an unwanted shift of the zoom center from the image center in a direction toward the edge of the image, and therefore the need to correct for this unwanted shift arises.

With the determination of the zoom parcentricity deviation from two zoom positions that deviate from one another, the zoom center is initially determined implicitly and explicitly for the currently active objective, preferably from the two extreme zoom positions for every objective, so that the correlation between the zoom factor and the travel length of the objective necessary for the corresponding correction of the zoom parcentricity deviation can be calculated. In practice, the parcentricity correction is, once again, carried out using a means for positioning the object in the object plane, e.g., with sufficiently precise motorized stages. This procedure is performed for every objective, because the use of a different objective results in different zoom centers which have to be adjusted individually.

Since there can also be multiple switch positions for an objective on stereomicroscopes (3D centrally between the left and right channel of the zoom body, and 2D in front of a channel of the zoom body), the disclosed method can be applied generally to every possible objective switch position, wherein a separate zoom center is assigned to every objective switch position.

Advantageously, the target position in the image corresponds to the ocular center in the eyepiece which can be made visible with a reticle or similar marking, or the target position in the image corresponds to the image center of the camera image which can be made visible with a cross or similar marking depicted in the image using software.

Also advantageously, the target positions can be selected using freely positionable markings in the camera image, wherein the marked target positions in the image can be assigned to the real positions in the object plane using connected image processing, wherein the positioning of the object for the first and second zoom magnification according to the previously described method is replaced with the freely selectable markings in the camera image, wherein the XY positional differences between the two target positions in the camera image are calculated back into the object plane, such that the previously disclosed mathematical relationship still applies, and wherein the index i relates to the current optically effective configuration of the system and at least one exchangeable component.

In a further advantageous embodiment, the target position in the first zoom magnification is adjustable using a freely positionable marking in the camera image, wherein the positioning of the objective is replaced only for said first zoom magnification by freely selectable marking in the camera image, and wherein the position of the object detail in the second zoom magnification is detected automatically in the camera image through image processing and converted to the object plane, such that the resulting XY positional differences between the two target positions in the object plane can be calculated according to the mathematical relationship disclosed hereinabove. The method can be executed automatically, after confirming the first target position in the camera image, that index i relates to the current optically effective configuration of the system, and that at least one exchangeable component with the index i is involved.

Furthermore, parcentricity correction for different optically effective configurations, which differ from one another through at least one optically, effectively exchangeable, component between the object plane and the image plane, is provided, wherein every optically effectively exchangeable component of a configuration has a coding which enables an unambiguous assignment to a correspondingly effective zoom center, such that the parcentricity deviations can be corrected for every configuration using the disclosed mathematical relationship.

The optically, effectively exchangeable components can be objectives on a nosepiece, wherein every objective can also comprise multiple objective switch positions, such that a change of the optically effective configurations is determined by the combination of an objective in a certain objective switch position which bears the index i. Expediently, the positioning of the object in the object plane can be effected using a motorized stage.

Advantageously, the XY coordinates can be based on the accurately positioned object, such that the XY origin of coordinates is located in every zoom magnification in the target position of the image projected back into the object plane, wherein said function is optionally selectable.

Furthermore, it is advantageous that the zoom range is divided into multiple segments, with a first and second magnification for each segment, and wherein the required travel length for parcentricity correction is determined in order to determine the magnification-dependent parcentricity correction in each segment according to the mathematical relationship, and to provide it as control variable. The first magnification at zoom factor mo, and the second magnification at zoom factor mu, are identical with the corresponding reverse magnifications mu and mo from the adjacent segments, provided there are such adjacent segments.

Advantageously, the positioning of the object in the object plane is realized by means which enable a lateral relative movement between the object and the imaging beam path. Since the parcentricity correction can be optionally selected, this functionality can also be deactivated, if necessary or desirable.

Therefore, the method according to the invention enables automatic parcentricity correction, such that a desired target position appears stationary in the image after or even during zooming. If required, a position deviating from the image center can also be selected as the target position. With an additional transition to the object coordinates, the zoom-dependent parcentricity deviations can be compensated and also used for a zoom-dependent shift of the stage origin of coordinates to the target position projected back from the image into the object plane. As a result, the indicated XY-coordinates during the travel of the stage correspond at every zoom magnification to the actual deviations from the target position in the object plane. Moreover, the parcentricity for zoom systems, according to the invention, can be ensured without elaborate constructive procedures (tolerance limitations, adjustment points, special designs) because the standard components typically suitable for stereomicroscopy and macroscopy can be refitted almost cost-neutrally for the parcentricity correction, according to the invention.

BRIEF DESCRIPTION OF THE DRAWINGS

The embodiments of the present invention may be more completely understood in consideration of the following detailed description of various embodiments in connection with the accompanying drawings, in which.

DETAILED DESCRIPTION OF THE DRAWINGS

Figure 1:
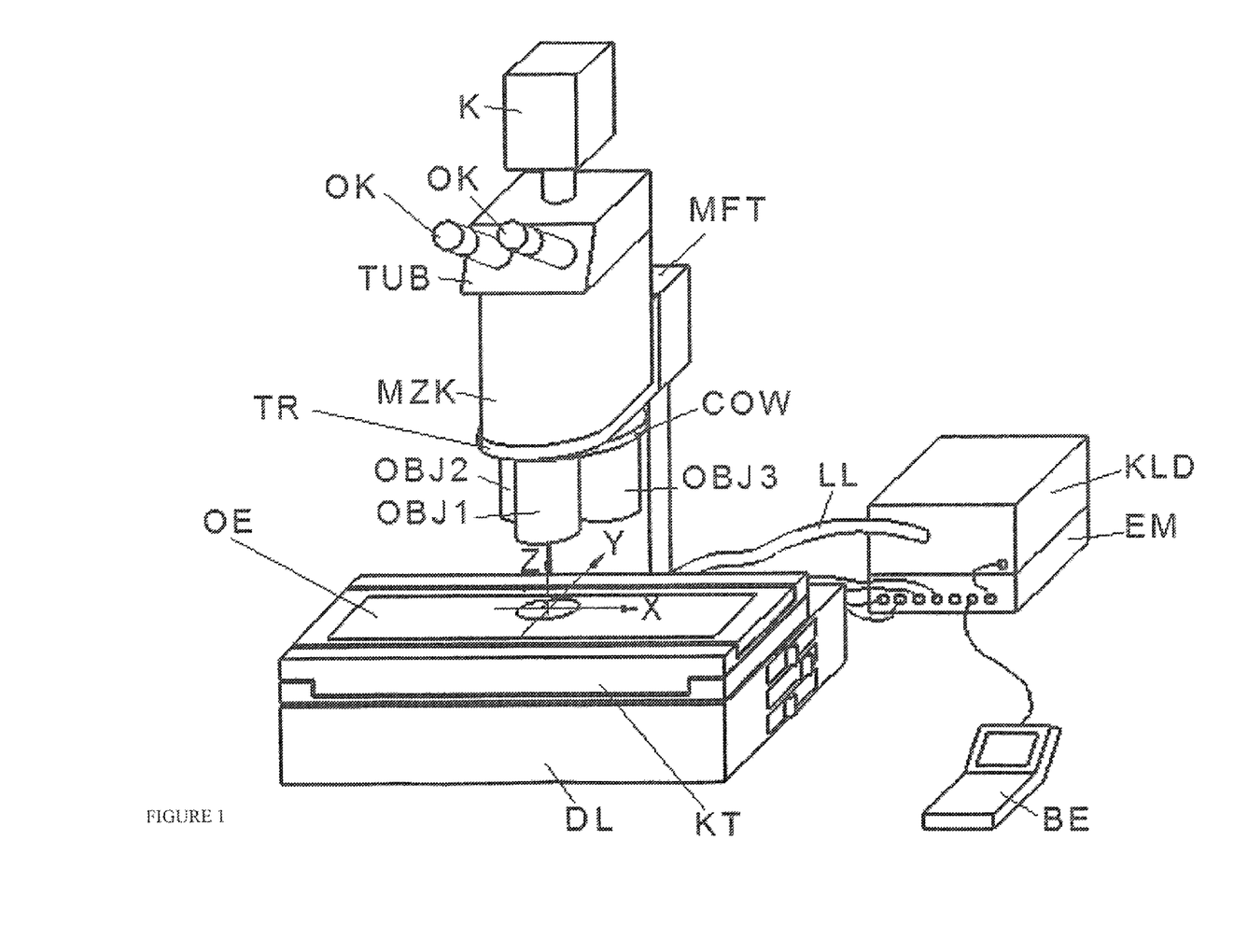
FIG. 1 is a depiction of a typical zoom system.

FIG. 1 depicts a typical zoom system, including a transmitted-light device DL which is supplied with light using a cold-light source KLD and a light guide LL, a motorized XY-stage KT with the directions of movement X and Y, a motorized focusing drive MFT with the direction of movement Z, a motorized zoom body MZK in a carrier TR which holds a coded lens changer COW with the objectives OBJ1, OBJ2, and OBJ3, a tube TUB, a camera K, two eyepieces OK, a control device EM, a display and control unit BE. The object plane OE is located closely above the stage surface.

The parcentricity of different objectives OBJ1, OBJ2, and OBJ3 used in a system ensures that no unwanted center displacement occurs after an objective change using the coded lens changer COW. The production tolerances of all components involved might be minimized at extreme expenditures, and therefore interfering deviations would no longer occur. In order to avoid such high costs, parcentricity managers are already available which compensate parcentricity deviations for all objectives OBJ1, OBJ2, OBJ3 by determining a reference objective OBJ1 and correcting the center deviations of the other objectives OBJ2, OBJ3 from said reference objective OBJ1 by changing the object position using a motorized XY-stage KT and a display and control unit BE such that all center positions match. The stage movements are stored using the control device EM and reproduced when the appropriate objective is selected again.

Figure 2:
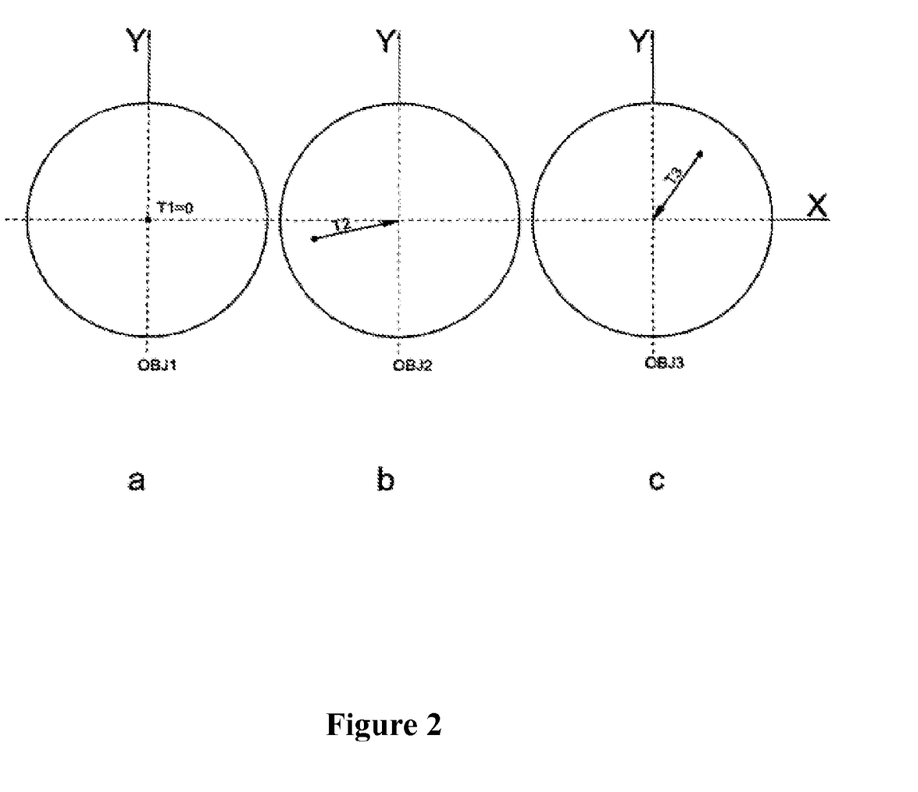
FIG. 2 is a depiction of the object plane.

FIG. 2 shows the above-described process. At first, the reference objective OBJ1 is moved into the beam path and an identifiable object detail is positioned in the image or object center (X=0; Y=0) using the motorized XY-stage KT, i.e., the amount of the XY-vector for the required stage movement T1 for the objective OBJ1 has a value of 0 mm. The stage movement is subsequently stored. Then objective OBJ2 is activated and the stage moved such that the identifiable object detail is once again located in the image or object center (X=0; Y=0). This requires a travel length in the object plane which corresponds to the XY-vector T2. This value for the objective OBJ2 is once again stored. Analogously, the stage is moved for parcentricity correction of objective OBJ3 such that the travel length corresponds to the XY-vector T3, in order for the object detail to be in the image or object center (X=0; Y=0) once again. Said value for the objective OBJ3 is stored once again.

After exiting the process for parcentricity correction, the determined travel lengths for correcting the parcentricity are unambiguously assigned to the objective switch positions. Through switching to another objective switch position, the stored correction vector T1, T2, or T3 is simply reproduced. Thus, the function of a classic parcentricity manager solely comprises the storing and reproducing of stage positions which are assigned to the corresponding objective switch position in which they were saved.

These systems do not provide variations of the zoom factor, and they are not capable of compensating the thus occurring and significantly interfering, additional variation of the positional deviations from a reference position. In addition, zoom systems are, as a rule, constructed modularly, so the production deviations of a plurality of components can, in total, add up such that the parcentricity deviations interfere to an extreme degree during zooming. Typically, all relationships between the production deviations of the individual components and the resulting parcentricity error must be determined. The known methods for parcentricity correction, however, do not take this into account.

In principle, zoom systems have the problem of changing the center displacement between the activated objectives during zooming. Therefore, the known methods for parcentricity compensation only function with the zoom factor which was used during the parcentricity correction process. As a rule, the object details previously positioned in the center move away from the center during zooming. With greater zoom ranges, this effect results in clearly interfering parcentricity deviations.

With the known methods for parcentricity adjustment, target positions deviating from the image center can be used as a position reference in the image, but in zoom systems, this can frequently result in deviations of such magnitude that the object detail of interest is no longer visible in the field of view during variation of the zoom factor. The relationships are depicted and explained using FIGS. 3 and 4, with the assumption that there is a stationary zoom center positioned in the image with the objective OBJ1, and thus independent from the magnification which deviates from the target position in the image.

Figure 3:
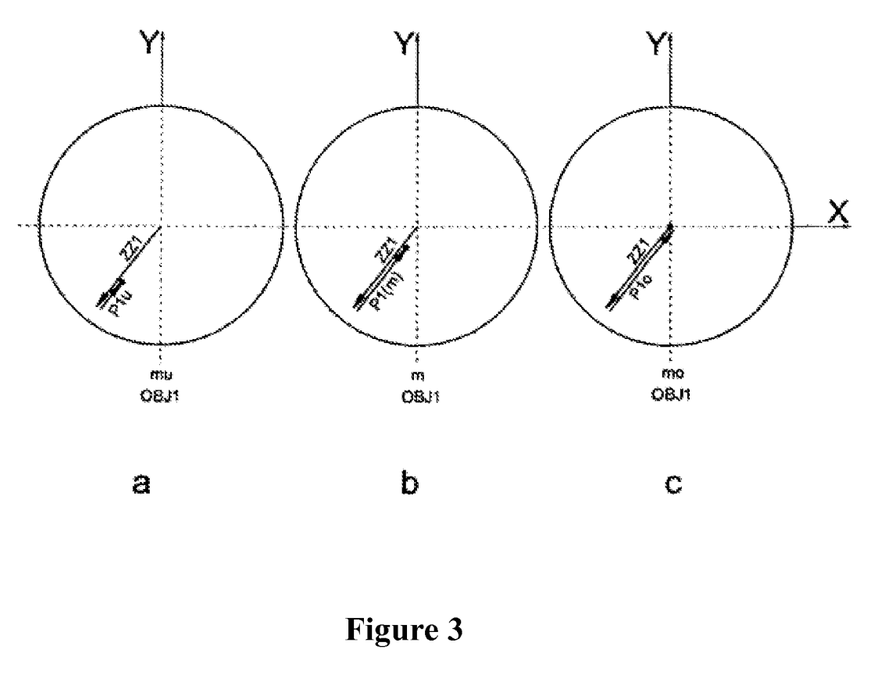
FIG. 3 is a depiction of the image or intermediate image plane OBJ1.

FIGS. 3a, 3b, and 3c depict the image plane of the imaging using objective OBJ1 with an assumed target position as the origin of an corresponding XY coordinate system, a magnification-independent zoom center with the distance vector ZZ1 proceeding from the target position, and the distances from zoom center to the XY-positions of the object detail in the image plane described by the XY-vectors P1$o$ at a first magnification mo (FIG. 3c), P1$u$ at a second magnification mu (FIG. 3a), and P1($m$) at a current magnification m (FIG. 3b).

Figure 4:
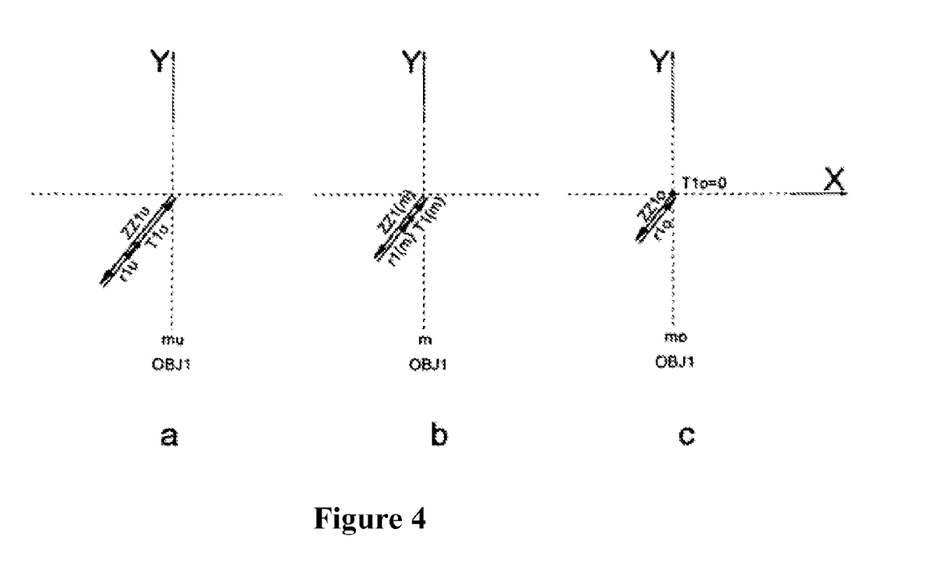
FIG. 4 is a depiction of the object plane OBJ1.

FIGS. 4a, 4b, 4c depict the object plane OE of the imaging using the objective OBJ1 with the assumed target position as the origin of the corresponding XY coordinate system, a magnification-dependent zoom center with the distance vector ZZ to at a first magnification mo (FIG. 4c), ZZ1$u$ at a second magnification mu (FIG. 4a), and ZZ1($m$) at the current magnification m (FIG. 4b), each proceeding from the target position, and the distances from the magnification-dependent zoom center to the XY-positions of the object details in the object plane described by the XY-vectors r1$o$ calculated back from the image plane into the object plane at a first magnification mo (FIG. 4c), r1$u$ at a second magnification mu (FIG. 4a), and r1 ($m$) at the current magnification m (FIG. 4b). The magnification-dependent XY-vectors T1$o$ at a first magnification mo (FIG. 4c), T1$u$ at a second magnification mu (FIG. 4a), and T1($m$) at the current magnification m (FIG. 4b) correspond to the travel lengths of the average required for parcentricity correction for object positioning in the object plane. According to the depictions in FIGS. 3 and 4, there is no parcentricity deviation at the first magnification mo, i.e., at the first magnification, and the object detail lies in the target position and T1$o$=O.

According to FIGS. 3 and 4, the following relationships apply:

$$ZZ1u=(1/mu)*ZZ1$$

$$ZZ1(m)=(1/m)*ZZ1$$

$$ZZ1o=(1/mo)*ZZ1$$

$$r1u=(1/mu)*P1u$$

$$r1(m)=(1/m)*P1(m)$$

$$r1o=(1/mo)*P1o$$

$$T1u=-ZZ1u-r1u$$

$$T1(m)=-ZZ1(m)-r1(m)$$

$$T1o=-ZZ1o-r1o$$

$$mu*P1o=mo*P1u$$

$$m=*P1o=mo*P1(m)$$

$$ZZ1=-P1o$$

$$ZZ1=-P1o$$

Subsequent conversion results in the required travel length for parcentricity correction:

$$T1(m)=(((1/m)-(1/mo)/((1/mu)-(1/mo)))*T1u$$

According to FIGS. 3 and 4, this relationship only provides the required travel lengths on condition that the object detail of interest, in the first magnification, is already situated in the target position which is easily realized for the initially considered, individual objective OBJ1. Therefore, this relationship can only apply to one objective because zoom systems may also require a parcentricity correction according to FIG. 2. Thus, the above-mentioned relationship must be transferred to a corresponding general form which is described in FIGS. 5 and 6.

Figure 5:
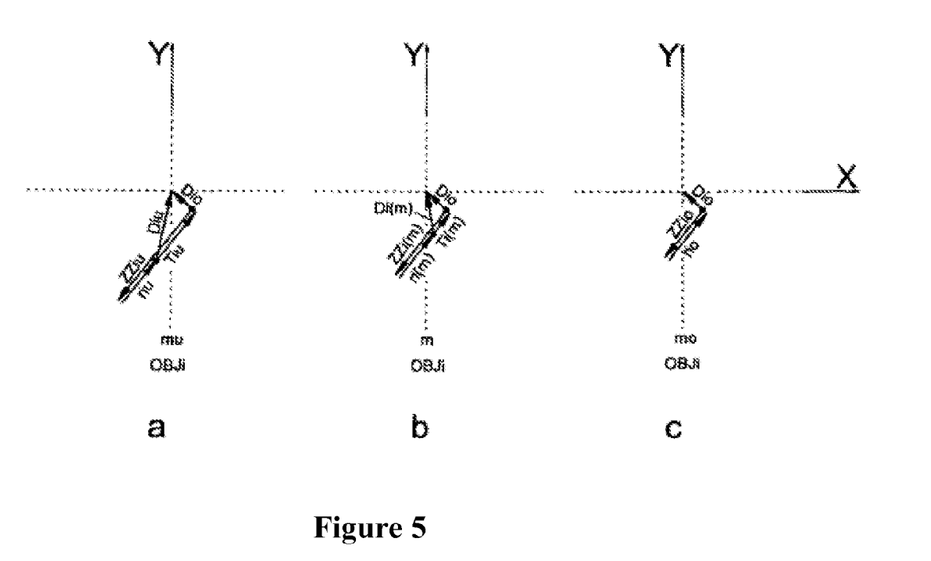
FIG. 5 is a depiction of the object plane OBJi.
Figure 6:
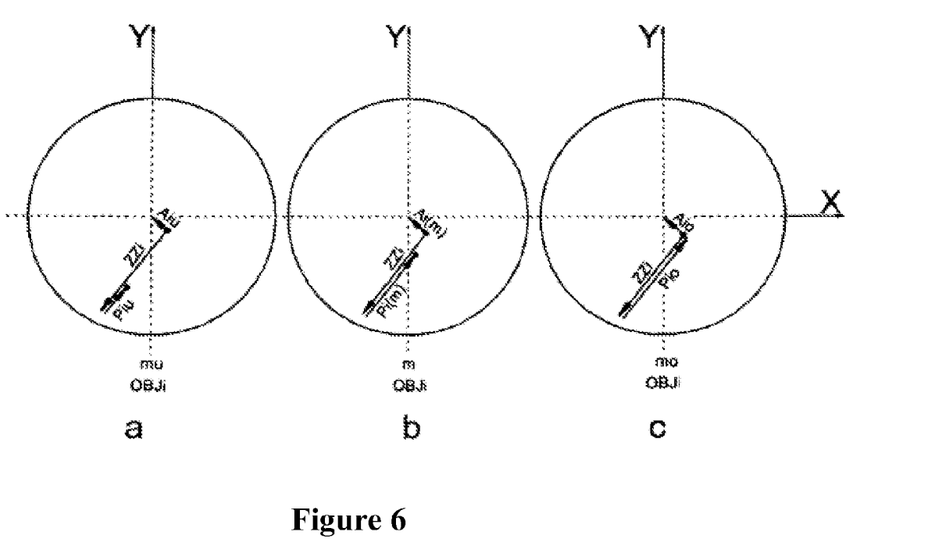
FIG. 6 is a depiction of the image or intermediate image plane OBJi.

According to FIGS. 5 and 6, index i is used which is provided for differentiating different optically effective configurations, each characterized by the at least one optically, effectively changeable component between object and image plane. Every optically, effectively changeable component of a configuration has a coding which allows for an unambiguous assignment to a correspondingly effective zoom center. For example, a coded lens changer COW provides the required information for an unambiguous identification of an optically effective configuration. Multiple switch positions of an objective can correspond to differently optically effective configurations; in principle, this also applies to all other procedures in the beam path which cause a change of the XY-position of the zoom center.

Analogous to the previous considerations, the following relationships apply according to FIGS. 5 and 6:

$$ZZiu=(1/mu)*ZZi$$

$$ZZi(m)=(1/m)*ZZi$$

$$ZZio=(1/mo)*ZZi$$

$$riu=(1/mu)*Piu$$

$$ri(m)=(1/m)*Pi(m)$$

$$rio=(1/mo)*Pio$$

$$Tiu=-ZZiu-riu$$

$$Ti(m)=-ZZi(m)-ri(m)$$

$$Tio=-ZZio-rio$$

$$mu*Pio=mo*Piu$$

$$m=*Pio=mo*Pi(m)$$

$$ZZi=-Pio$$

In addition, the following applies:

$$Diu=Tiu+Dio$$

$$Di(m)=Ti(m)+Dio$$

The XY-vectors Dio and Diu describe the required stage travel lengths in the first magnification mo or in the second magnification mu which function as input variables for the calculation. Subsequent conversion results in the required travel length Di(m) for parcentricity correction in the general form:

$$Di(m)=(((1/m)-(1/mo))/((1/mu)-(1/mo)))*Diu+(((1/mu)-(1/m))/((1/mu)-(1/mo)))*Dio$$

For detecting the positional differences, an input method (sequence) is preferably processed, wherein the user performs the necessary inputs using a control and display unit, and the input method includes the following steps:

a) activation of the input method using a button;
b) activation of the reference configuration i displayed in the control and display unit in the predetermined catch position;
c) activation of a first larger zoom magnification using a button;
d) positioning of an object detail visible in the image in the entire zoom region using a means for positioning the object in the object plane in a target position in the image;
e) storing of said actually attained target/object position for the first zoom magnification;
f) activation of a second, smaller zoom magnification using a button;
g) positioning of the object detail in the target position in the image using the means for positioning the object in the object plane;
h) storing of said actually attained target/object position for the second zoom magnification;
i) advancing of the objective to the next available catch position, if applicable, and repetition of method a) to h);
j) switching to an available further objective, if applicable, to the first of the multiple available catch positions for this objective, if applicable, and repetition of method a) to i);
k) if applicable, repetition of method j) for every additional objective;
l) exiting the input method using a button, wherein the stored values can become active after exiting the input method, i.e., the required travel length for parcentricity correction is calculated according to the mathematical relationship:

$$Di(m)=(((1/m)-(1/mo))/((1/mu)-(1/mo)))*Diu+(((1/mu)-(1/m))/((1/mu)-(1/mo)))*Dio$$

and provided as target for the travel length for the zoom-dependent parcentricity correction, wherein index i relates to the actual, optically effective configuration of the system and at least one exchangeable component with the index i is involved.

FIGS. 7 to 11 show the user interface of the display and control unit BE in different operating modes.

Figure 7:
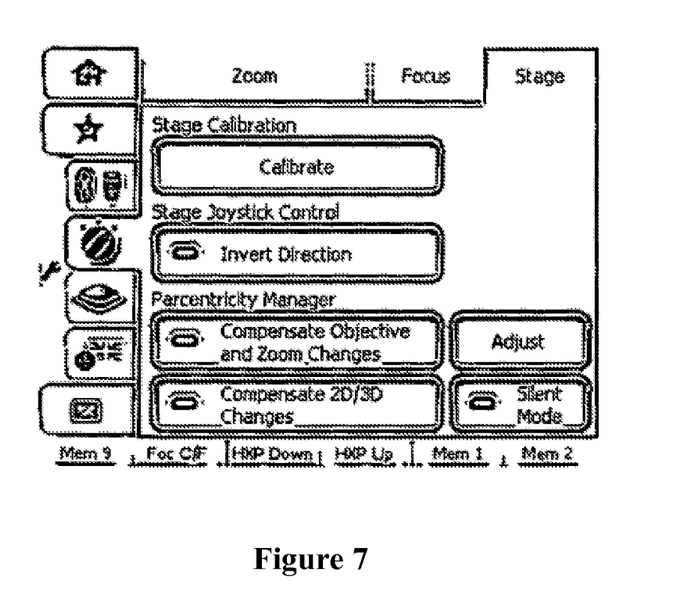
FIG. 7 is a depiction of the user interface of the display and control unit BE in a first determined operating mode.

According to FIG. 7, the buttons "Compensate Objective and Zoom Changes," "Adjust" (selection from the input method), "Compensate 2D/3D Changes" (compensate the switch between 2D and 3D objective positions), and "Silent Mode" (mode for displaying the object coordinates) are directly selectable and combined under the broader term "Parcentricity Manager."

By pressing the button "Adjust," the input method according to a) is activated, wherein the determined data are permanently stored until overridden by a new selection.

Figure 8:
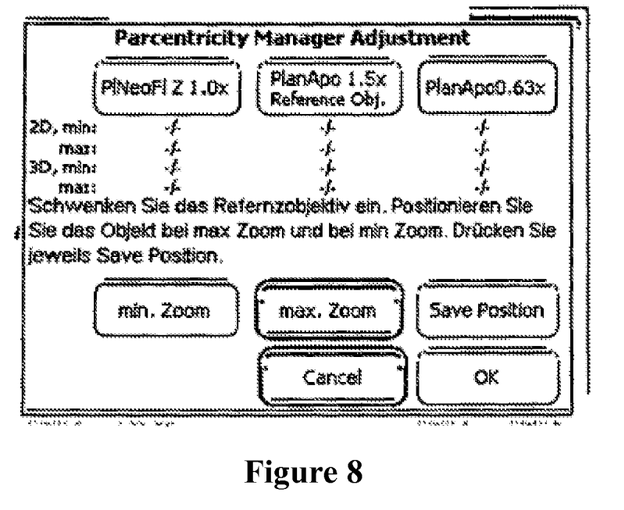
FIG. 8 is a depiction of the user interface of the display and control unit BE in a second determined operating mode.

FIG. 8 shows the input mask which is displayed after selecting the input method according to a). The buttons "Min. Zoom" (minimal zoom magnification), "Max. Zoom" (maximum zoom magnification), "Save Position," "Cancel," and "OK" (confirmation of entries) can be activated directly. Moreover, all possible switch positions for every optically effective configuration are displayed; in this case, these are the already configured objectives with the possible switch positions 2D and 3D each.

For every optically effective configuration, the values for the required travel lengths for parcentricity correction in a first and a second magnification are to be entered; in this case, the magnification with the Max. Zoom factor corresponds to the first magnification and the magnification with the Min. Zoom factor corresponds to the second magnification.

According to FIG. 8, the user is prompted to first activate the reference objective according to b) which, e.g., is characterized by the smallest depth of field of all three indicated objectives and the button of which shows the legend "Reference Obj." Then the object detail is to be positioned in the first (in this case, e.g., "at Max. Zoom") and in the second (in this case, e.g., "at Min. Zoom") zoom magnification in the target position (in this case, e.g., in the image center). According to c), the button "Max. Zoom" is pressed and the object detail, according to d), is moved to the target position using the means for positioning the object in the object plane (in this case, e.g., with the use of a motorized stage), wherein the adjusted XY-position subsequently is to be saved according to e) using the button "Save Position." The stored XY-position is assigned to the activated objective (in this case, the objective "PlanApo 1.5×") in the currently active objective position (in this case, in the position "2D, max"). For this purpose, a correct setup is important, i.e., the assignment of the objectives to the switch positions must previously have been inputted correctly.

Analogously, according to f), the button "Min. Zoom" is pressed and the object detail, according to g), is moved to the target position using the means for positioning the object in the object plane (in this case, e.g., with the use of a motorized stage), wherein the adjusted XY-position subsequently is saved according to h) using the button "Save Position." The stored XY-position is, once again, assigned to the activated objective (in this case, the objective "PlanApo 1.5×") in the currently active objective position (in this case, in the position "2D, min").

Figure 9:
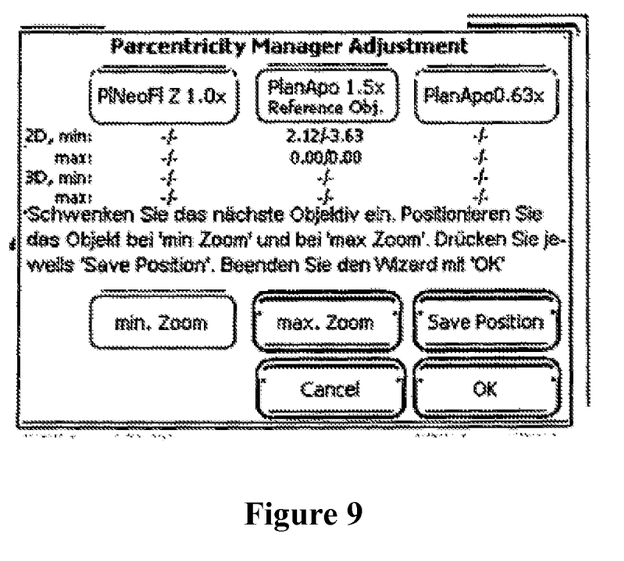
FIG. 9 is a depiction of the user interface of the display and control unit BE in a third determined operating mode.

FIG. 9 shows the display after execution of said steps, wherein the XY-values after executed parcentricity correction are additionally each set to 0 (0.00/0.00) in the first magnification which is not necessarily required for the basic function according to the invention.

Analogous to the entries executed thus far, the required travel lengths for parcentricity correction are also determined for other optically effective configurations different from one another. At first, the next optically effective configuration is activated, wherein the sequence of activations is not imperative for the function according to the invention. However, it must be noted that both travel lengths required for parcentricity correction (in the first and second magnification) are determined for every selectable, optically effective configuration.

Figure 10:
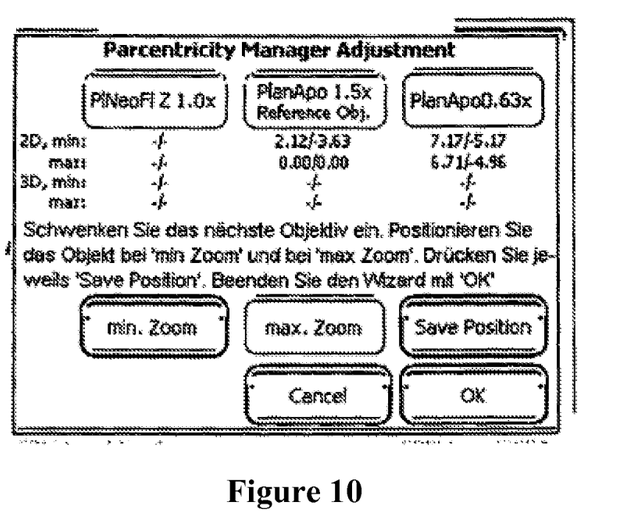
FIG. 10 is a depiction of the user interface of the display and control unit BE in a fourth determined operating mode.

As an example, FIG. 10 shows the display after entry of the values for a further objective, in this case the objective "PlanApo 0.63×," wherein at first only the 2D switch positions each were used for both objectives. However, according to i), it is preferred to initially move the currently active objective to the available next catch position, if applicable, and to repeat the method according to a) to h) until all selectable catch positions for said objective are configured. Only then, the switch to a further available objective, if applicable, to the first of the available multiple catch positions, if applicable, for said objective is to be made according to j) in order to repeat method according to a) to i). According to k), this sequence is to be repeated for every further configured objective. Subsequently, the input method according to l) must be exited using the button "OK," and so the display, once again, corresponds to FIG. 7.

With the button "Compensate Objective and Zoom Change" in FIG. 7, the user determines whether or not the automatic parcentricity correction is to be activated. An activated button indicates the activated automatic parcentricity correction, i.e., the means for positioning the object in the object plane positions the object detail in every zoom magnification in the target position of the image.

By activating the button "Silent Mode," the XY-coordinates are related to the accurately positioned object, i.e., the XY origin of coordinates is located in every zoom magnification in the target position of the image projected back into the object plane.

By pressing the button "Compensate 2D/3D Changes" in FIG. 7, the displacement which occurs through switching of the objective between the center position of the objective (3D position symmetrically between the two stereo channels) and an off-center objective position (2D position in front of a stereo channel, e.g., in front of the right stereo channel) is compensated. In practice, said button is only relevant with deactivated or non-configured (default setting) parcentricity manager because the displacement is compensated through the configured parcentricity manager.

All deviations known thus far, which can occur due to production, can be compensated with the described method. If further deviations occur which have not yet emerged and which cannot be directly compensated according to the invention, the zoom range can be divided into multiple segments, each following the mathematical relationship:

$$Di(m)=(((1/m)-(1/mo))/((1/mu)-(1/mo)))*Diu+(((1/mu)-(1/m))/((1/mu)-(1/mo)))*Dio.$$

As a result, there is a first and second magnification for each segment, with which the required red travel length for parcentricity correction is determined in order to be able to determine the magnification-dependent parcentricity correction in this segment according to the already mentioned mathematical relationship and provide said magnification-dependent parcentricity correction as a control variable, wherein the first magnification at zoom factor mo and the second magnification at zoom factor mu is identical with corresponding reverse magnifications mu and mo from the adjacent segments, provided there are such adjacent segments.

Figure 11:
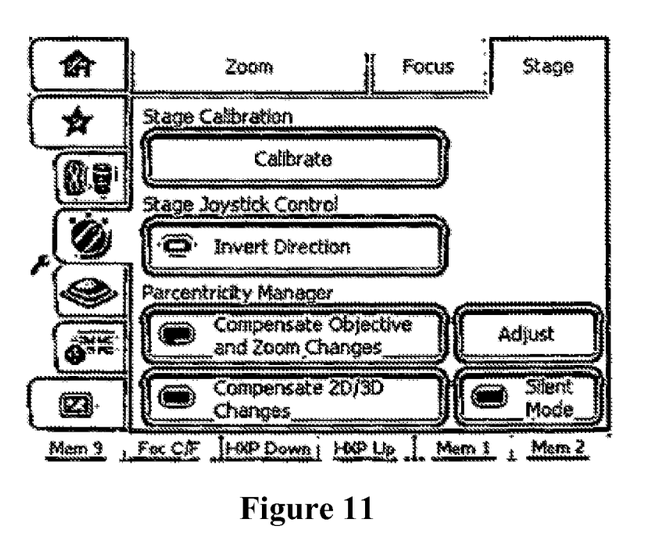
FIG. 11 is a depiction of the user interface of the display and control unit BE in a fifth determined operating mode.

FIG. 11 corresponds to FIG. 7, however, all selectable buttons in the area "Parcentricity Manager" are activated.

The invention claimed is:

1. A method for correcting parcentricity in an optical zoom system, said optical zoom system including an object positioning stage and providing for a zoom range of a current optically effective configuration comprising a currently active objective, the method comprising:
   detecting a positional difference in an image of an object between at least two different zoom positions of said current optically effective configuration; determining a zoom center in the image which remains stationary during zooming;
   calculating the travel lengths of the object positioning stage required to correct the zoom-dependent parcentricity error; and providing said calculated travel lengths as a control variable for the appropriate positioning of the object positioning stage, such that a target position appears stationary in the image during zooming throughout said zoom range.

2. The method according to claim 1, wherein a user provides inputs using a control and display unit, the method comprising:
   a) selecting an input method using a button;
   b) selecting a reference configuration i (index for components) displayed in the control and display unit in a predetermined catch position;
   c) selecting a first larger zoom magnification using a button;
   d) positioning an object detail visible in the image in the entire zoom region, using the object positioning stage, in the object plane in the target position in the image;
   e) storing said target position for the first zoom magnification;
   selecting a second, smaller zoom magnification using a button;
   g) positioning the object detail in the target position in the image using the means for positioning the object in the object plane;
   h) storing said actually attained target position for the second zoom magnification;
   i) advancing the objective to a next available catch position, if applicable, and repeating steps a) to h);
   j) optionally selecting each of a plurality of further objectives, and selecting the first of a plurality of available catch positions for each objective, and repeating steps a) through i) for each additionally selected objective;
   k) exiting the input method using a button, whereupon the required travel length for parcentricity correction is calculated, using the stored values, according to the mathematical relationship:

$$Di(m)=(((1/m)-(1/mo))/((1/mu)-(1/mo)))*Diu+((1/mu)-(1/m))/((1/mu)-(1/mo)))*Dio;$$

where:
   Di(m) is an XY-vector of a travel length in the object plane required for parcentricity correction for a configuration with the index i at a current magnification m;
   Diu is an XY-vector of the travel length in the object plane required for parcentricity correction for a configuration with the index i at a second magnification mu;
   Dio is an XY-vector of the travel length in the object plane required for parcentricity correction for a configuration with the index i at a first magnification mo;
   m is the current magnification between the object plane and the image plane;
   mo is the first magnification between the object plane and the image plane with greater zoom factor; and
   mu is the second magnification between the object plane and the image plane with smaller zoom factor.

3. The method of claim 2, wherein the stored target positions correspond to the ocular center in an eyepiece which can be made visible with a reticle or similar marking.

4. The method of claim 2, wherein the stored target positions correspond to the image center of a camera image made visible with a cross or similar marking depicted in the image.

5. The method of claim 4, wherein the stored target positions are selected using a freely positionable marking in the camera image, wherein the stored target positions are assigned to a real position in the object plane using connected image processing, wherein the positioning of the object for the first and second zoom magnification is replaced with the freely selectable marking in the camera image, wherein the XY positional differences between the stored target positions are calculated back into the object plane, and wherein the index i relates to a current optically effective configuration of the system and at least one exchangeable component.

6. The method of claim 5, wherein the target position in the first zoom magnification is freely adjustable using a freely positionable marking in the camera image, wherein the positioning of the objective is replaced only for said first zoom magnification by the freely selectable marking in the camera image, wherein the position of the object detail in the second zoom magnification is detected automatically in the camera image through image processing and converted to the object plane, such that the resulting XY positional differences between the stored target positions in the object plane can be calculated, and wherein the method, after confirmation of the first target position in the camera image, is executed automatically and index i relates to the current optically effective configuration of the system and at least one exchangeable component.

7. The method of claim 5, wherein the target position in the first zoom magnification is freely adjustable using a freely positionable marking in the camera image, wherein the positioning of the objective is replaced only for the first zoom magnification by the freely selectable marking in the camera image, wherein the position of the object detail in the second zoom magnification is detected automatically in the camera image through image processing, and the object positioning stage is controlled on the basis of a position control such that the object detail in the camera image is positioned in the desired target position.

8. The method of claim 5, wherein the XY positional differences are based on the accurately positioned object, such that the XY origin of coordinates is located in every zoom magnification in the target position of the image projected back into the object plane.

9. The method of claim 2, wherein parcentricity correction for different optically effective configurations, which differ from one another through at least one optically, effectively exchangeable component between the object plane and the image plane, is provided, wherein every optically, effectively exchangeable component of a configuration has a coding which allows for an unambiguous assignment to a correspondingly effective zoom center, and so the parcentricity deviations can be corrected for every configuration using the mathematical relationship according to claim 2.

10. The method of claim 9, wherein the optically, effectively exchangeable components are objectives on a nosepiece, wherein every objective can also comprise multiple objective switch positions, such that a change of the optically effective configurations is determined by the combination of an objective in a certain objective switch position which bears the index i.

11. The method of claim 2, wherein the zoom range is divided into multiple segments and there is a first and second magnification for each segment with the required travel length for parcentricity correction determined so as to determine the magnification-dependent parcentricity correction, wherein the first magnification at zoom factor mo and the second magnification at zoom factor mu are identical with the corresponding reverse magnifications mu and mo from the adjacent segments.

12. The method of claim 1, wherein the positioning of the object in the object plane is effected using a motorized stage.

13. The method of claim 1, wherein the object positioning stage allows for a lateral relative movement between the object and the imaging beam path.

* * * * *